(12) United States Patent
De Ridder

(10) Patent No.: US 7,887,101 B2
(45) Date of Patent: Feb. 15, 2011

(54) JOINT FOR CONNECTING TWO TUBES IN A HIGH-TEMPERATURE ENVIRONMENT

(75) Inventor: Christianus Gerardus Maria De Ridder, Hoogland (NL)

(73) Assignee: A.S.M. International N.V, Bilthoven (NL)

( * ) Notice: Subject to any disclaimer, the term of this patent is extended or adjusted under 35 U.S.C. 154(b) by 1000 days.

(21) Appl. No.: 11/716,335

(22) Filed: Mar. 9, 2007

(65) Prior Publication Data
US 2008/0217909 A1 Sep. 11, 2008

(51) Int. Cl.
*F16L 27/04* (2006.01)
(52) U.S. Cl. .......................................... 285/261; 285/96
(58) Field of Classification Search ................... 285/14, 285/121.7, 121.4, 145.3, 98, 95, 96, 261, 285/268, 121.3, 121.6; 403/40
See application file for complete search history.

(56) References Cited

U.S. PATENT DOCUMENTS

| | | | | | |
|---|---|---|---|---|---|
| 99,003 | A | * | 1/1870 | Robbins | 285/268 |
| 599,403 | A | * | 2/1898 | Roach | 285/121.7 |
| 663,587 | A | * | 12/1900 | Single | 277/362 |
| 807,768 | A | * | 12/1905 | Otis | 285/95 |
| 951,771 | A | * | 3/1910 | Nuttall | 285/121.7 |
| 2,417,491 | A | * | 3/1947 | Hill | 285/121.7 |
| 4,489,962 | A | * | 12/1984 | Caumont et al. | 285/263 |
| 5,226,677 | A | * | 7/1993 | Peter et al. | 285/121.6 |
| 6,499,768 | B2 | | 12/2002 | De Ridder et al. | |

* cited by examiner

*Primary Examiner*—Aaron Dunwoody
(74) *Attorney, Agent, or Firm*—William L. Botjer

(57) ABSTRACT

A joint for connecting two tubes. The joint includes a first tube that provides a ball interface at its end. The joint also includes a second tube that provides a cup interface inside its wall. The cup interface of the second tube and the ball interface of the first tube form a cup-ball interface. This cup-ball interface is located in the interior of the second tube.

16 Claims, 3 Drawing Sheets

JOINT FOR CONNECTING TWO TUBES IN A HIGH-TEMPERATURE ENVIRONMENT

BACKGROUND OF THE INVENTION

The present invention generally relates to the field of joints for connecting two tubes. More specifically, the present invention relates to connecting two tubes through a ball-cup connection in a high temperature environment.

In high temperature furnaces, tubes made of ceramic materials need to be connected to each other. These tubes may be process tubes, gas-feed tubes, gas-exhaust tubes, thermocouple tubes, and the like. The connection between two tubes is designed such that ingress and egress of gases is prevented.

Ball-cup connections are generally used to prevent ingress and egress of gases. In such a connection, a ball provided on a tube and a mating cup provided on another tube form in a mating and contacting position, wherein the surface-to-surface contact provides a mechanical seal. Typically, a ball and cup are made of the same material, and the design is such that the tolerances in the sizing of the ball and the cup can be accommodated. When the ball and cup are made of different materials, the design needs to be such that differences in the thermal expansion of the two materials can be accommodated. In such cases, the ball and cup exactly fit together at room temperature, but when heated, the actual contact between the ball and cup reduces from an area contact to a line contact, due to differences in the thermal expansion of the materials. Since the diffusion of gases occurs over the line contact easily, the ball-cup connection is not perfect. To minimize the diffusion, a clamp is used to press the ball against the cup, and an O-ring is required at the ball-cup interface, to provide tight sealing for the gas. However, at very high temperatures, the O-ring may degenerate and deteriorate the quality of the connection.

In U.S. Pat. No. 6,499,768, co-assigned with the present application, a ball-cup connection with a gas seal to prevent ingress and egress of gases is disclosed. In the '768 patent, a first tube is provided with a ball interface, which is located at an end of the first tube. Further, a second tube is provided with a cup interface, which is located at an end of the second tube. The cup interface of the second tube mates with the ball interface of the first tube and forms a cup-ball interface for connecting the first and the second tube, wherein the first and the second tube are external to each other. However, in some situations, there is a need to connect two tubes wherein one of the tubes is located inside the other tube. A connection known in the prior art that meets this need is an ultratorr connection, which is used in the vacuum technology. An ultratorr connection uses an O-ring that is compressed and sealed against the outside diameter of a tube that needs to be a vacuum tight connection to a vacuum chamber. However, due to the use of the O-ring, the ultratorr connection is not resistant to high temperatures.

Accordingly, there is a need for a connection that connects two tubes, wherein one tube is inside the other and the connection is resistant to high temperatures. Moreover, the connection should prevent ingress and egress of gases.

SUMMARY OF THE INVENTION

An object of the present invention is to provide a ball-cup connection to connect two tubes, wherein one tube is located inside the other.

Another object of the present invention is to provide a ball-cup connection that prevents the ingress and egress of gases in a high-temperature environment.

Another object of the present invention is to provide a ball-cup connection that prevents the ingress and egress of gases under sub-atmospheric or super-atmospheric pressure conditions.

Yet another object of the present invention is to provide a ball-cup connection that maintains a cup interface and a ball interface in mating, contacting and fixed position, relative to each other, at high temperatures.

To achieve the objects mentioned above, the present invention provides a ball-cup connection with a clamp and a gas seal. A ball interface is provided at one end of a first tube and a cup interface in a wall of a second tube. The cup interface of the second tube mates with the ball interface of the first tube to form a cup-ball interface. The cup-ball interface of the present invention is located in the interior of the second tube.

BRIEF DESCRIPTION OF THE DRAWINGS

Various embodiments of the present invention will hereinafter be described in conjunction with the appended drawings that are provided to illustrate and not to limit the present invention, wherein like designations denote like elements, and in which.

DESCRIPTION OF THE PREFERRED EMBODIMENTS

The present invention provides a ball-cup connection for connecting two tubes in a high-temperature environment. The ball-cup connection prevents the ingress and egress of gases.

Figure 1:
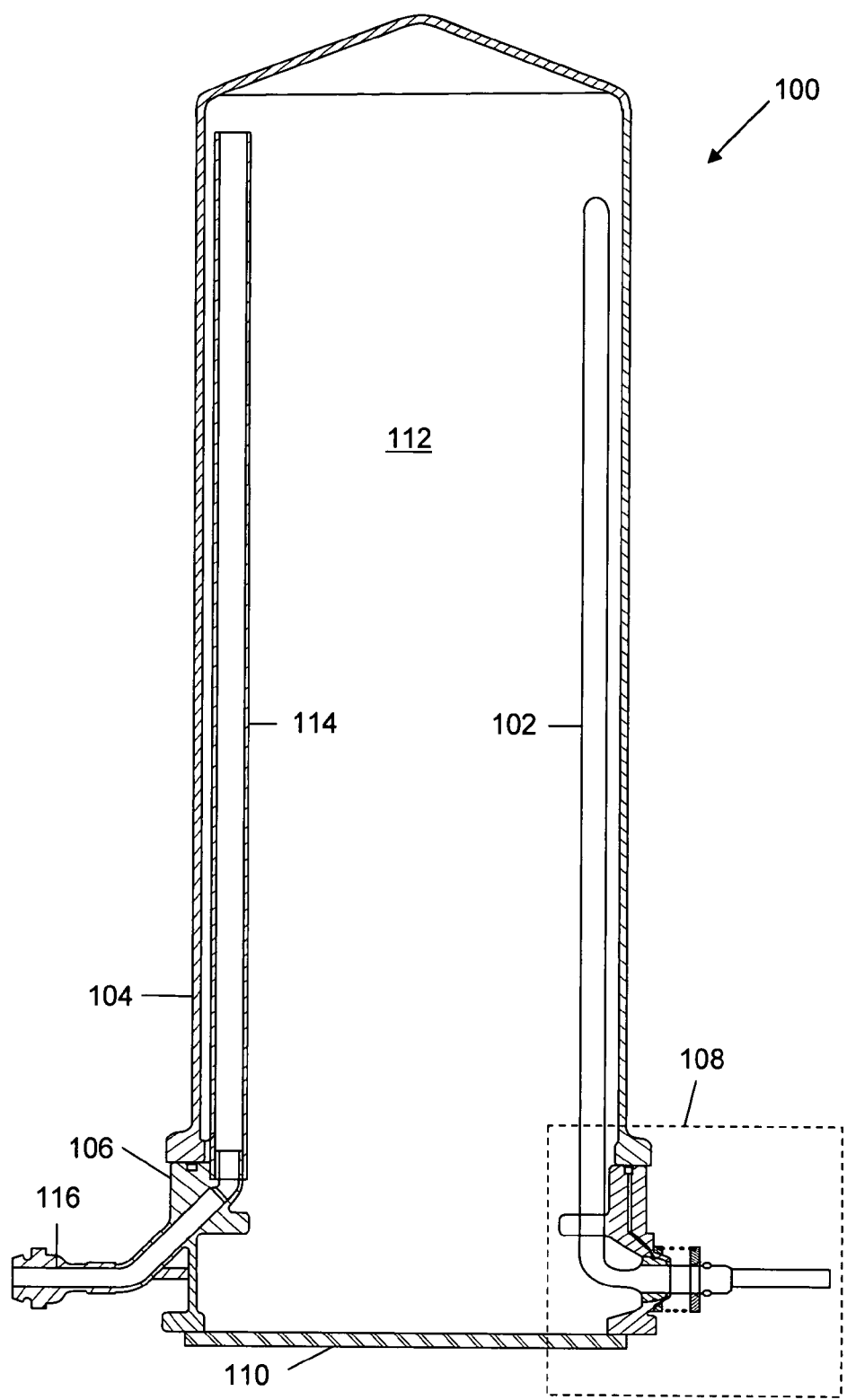
FIG. 1 is a diagram illustrating an exemplary furnace in which the present invention may be practiced.

FIG. 1 is a diagram illustrating an exemplary furnace 100 in which the present invention may be practiced. Furnace 100 includes a first tube 102, a second tube comprising a process tube 104 and a support tube 106, a ball-cup connection 108, a closure 110, a reaction chamber 112, a gas-dispersion tube 114, and a gas-feed tube 116. The second tube and closure 110 delimit process chamber 112. Furnace 100 is heated by a heater, not shown in the figure, which is provided around the second tube.

A substrate may be processed at elevated temperatures in furnace 100 by passing process gases through the second tube. The substrate is placed inside the second tube through a closeable opening at the bottom end of the second tube. In the closed state, the closeable opening is closed by closure 110. A substrate holder, not shown in the figure, accommodates a plurality of substrates in a vertically spaced arrangement. The substrate holder is placed inside the second tube for simultaneous processing of the plurality of substrates. In an embodiment of the present invention, the substrate may be a semiconductor material. First tube 102 is connected to support tube 106 by ball-cup connection 108. Ball-cup connection 108 is explained in detail with reference to FIG. 2 and FIG. 3.

Gas-dispersion tube 114, which is placed inside the second tube, is connected to gas-feed tube 116, which is fixedly connected to support tube 106. Gas is introduced in gas-feed tube 116 and flows in an upward direction through gas-dispersion tube 114 to the top of reaction chamber 112. The gas is introduced into the top of reaction chamber 112 from gas-dispersion tube 114, and exhausted from the bottom of reaction chamber 112 through a gas-exhaust tube, not shown in the figure.

Figure 2:
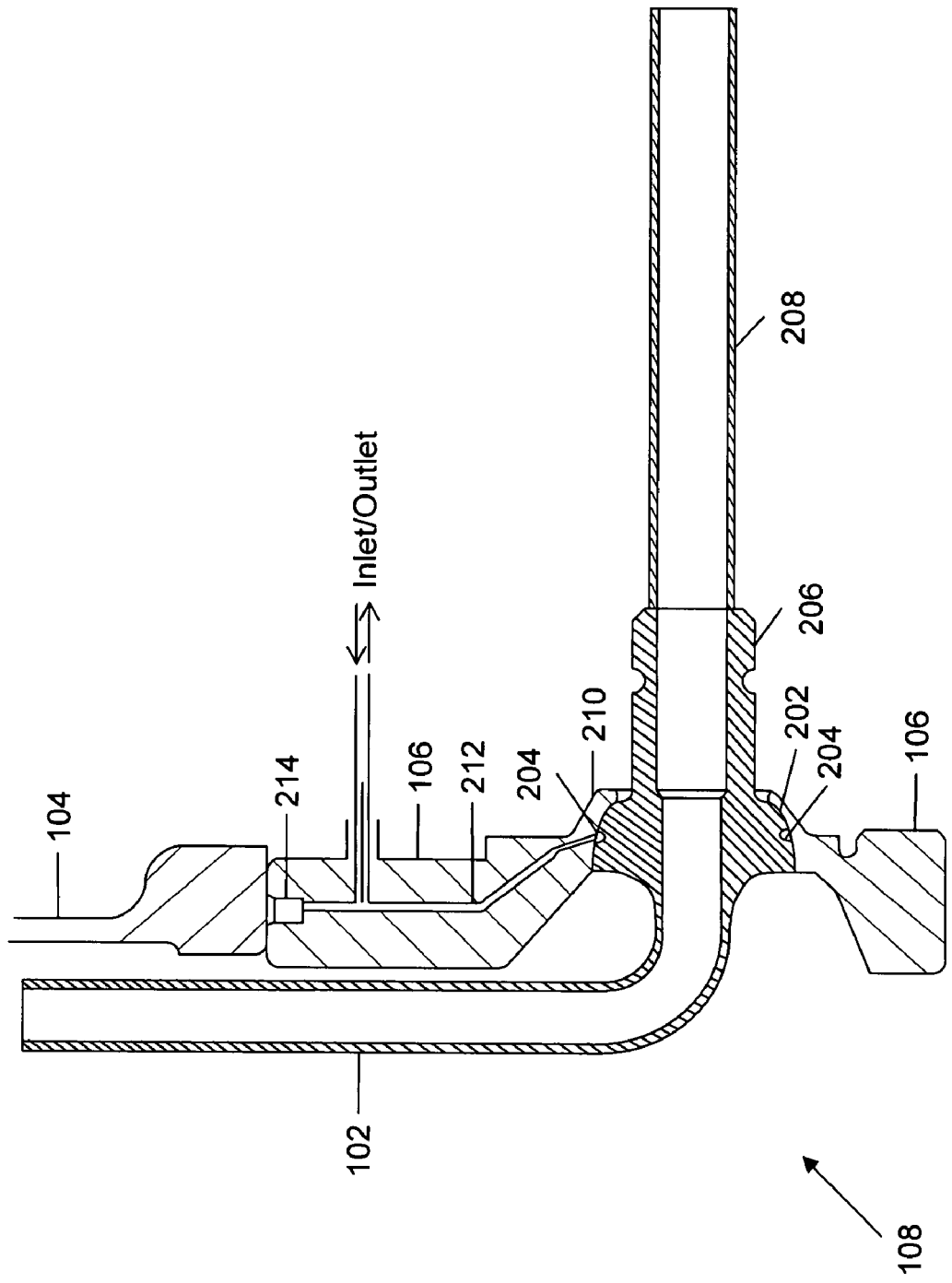
FIG. 2 is a diagram illustrating a ball-cup connection, in accordance with various embodiments of the present invention.

FIG. 2 is a diagram illustrating ball-cup connection 108, in accordance with various embodiments of the present invention. Ball-cup connection 108 includes first tube 102 that is provided with a ball interface 202, a groove 204 in ball interface 202, an outer collar 206, an outer part 208 of first tube 102, process tube 104, support tube 106 with a cup interface 210, a gas-feed/discharge channel 212, and a groove 214 provided inside the upper surface of support tube 106.

Ball interface 202 is provided at the end of first tube 102. In an embodiment of the present invention, first tube 102 may be a thermocouple tube with thermocouples or other sensors placed inside first tube 102. In another embodiment of the present invention, first tube 102 may be a gas-injector tube. Cup interface 210 is provided in the wall of support tube 106.

In embodiments of the present invention, shown in the figures, the second tube comprises process tube 104 and support tube 106. Support tube 106 supports process tube 104 on its upper surface, wherein support tube 106 rests on its turn on a support structure, not shown in the figure. In an embodiment of the present invention, support tube 106 is made of quartz. Cup interface 210 is provided in the wall of support tube 106. Cup interface 210 of support tube 106 and mating ball interface 202 of first tube 102 are in mechanical contact to form a cup-ball interface, which is present inside support tube 106.

In an alternative embodiment of the present invention, the second tube is a one-piece tube, wherein cup interface 210 is provided inside the wall of the second tube. Cup interface 210 of the second tube and ball interface 202 of first tube 102 form the cup-ball interface, which is present inside the second tube.

In another embodiment of the present invention, cup interface 210 is provided at the end of first tube 102, and ball interface 202 is provided inside the wall of the second tube. Cup interface 210 of first tube 102 and ball interface 202 of the second tube form the cup-ball interface.

A gas seal maintains the integrity of the cup-ball interface. The gas seal includes gas-feed/discharge channel 212 and circumferential groove 204 present at the cup-ball interface. Gas-feed/discharge channel 212 discharges at one end into groove 204 present in ball interface 202. In an alternative embodiment of the present invention, groove 204 is present in cup interface 210. In another embodiment of the present invention, one or more grooves 204 may be present in ball interface 202. Gas-feed/discharge channel 212 discharges at another end into circular groove 214 in the upper surface of support tube 106, present along the circumference of support tube 106. Gas-feed/discharge channel 212 is connected to an inlet/outlet for an exchange of gases. In various embodiments of the present invention, gas-feed/discharge channel 212 is connected to an inert gas source. This inert gas source introduces inert gas between ball interface 202 and cup interface 210 at super-atmospheric pressure conditions, i.e., above atmospheric pressure. The inert gas is introduced in groove 204 through gas-feed/discharge channel 212 at a rate that maintains a gas velocity that is sufficient to counteract the in-diffusion of ambient air or out-diffusion of process gas through the cup-ball interface. Further, the rate at which the inert gas is introduced from the inert gas source maintains the super-atmospheric pressure conditions at the cup-ball interface. In an embodiment of the present invention, gas-feed/discharge channel 212 is connected to a vacuum source. The vacuum source removes the gases from groove 204 through gas-feed/discharge channel 212. The vacuum source maintains the sub-atmospheric pressure conditions at the cup-ball interface.

Although it has been stated that first tube 102 is provided at the end with ball interface 202, FIG. 2 shows that ball interface 202 is provided at the end of the regular, internal part of first tube 102, but collar 206 and outer part 208 of first tube 102 extend beyond ball interface 202. The language "at the end" will be understood to include the above and enable the extension of the parts to be extended beyond ball interface 202, for constructional purposes, eventually.

A clamp is provided on outer collar 206 to maintain cup interface 210 and ball interface 202 in a mating, contacting and fixed position, relative to each other. The clamp is explained in detail with reference to FIG. 3.

Figure 3:
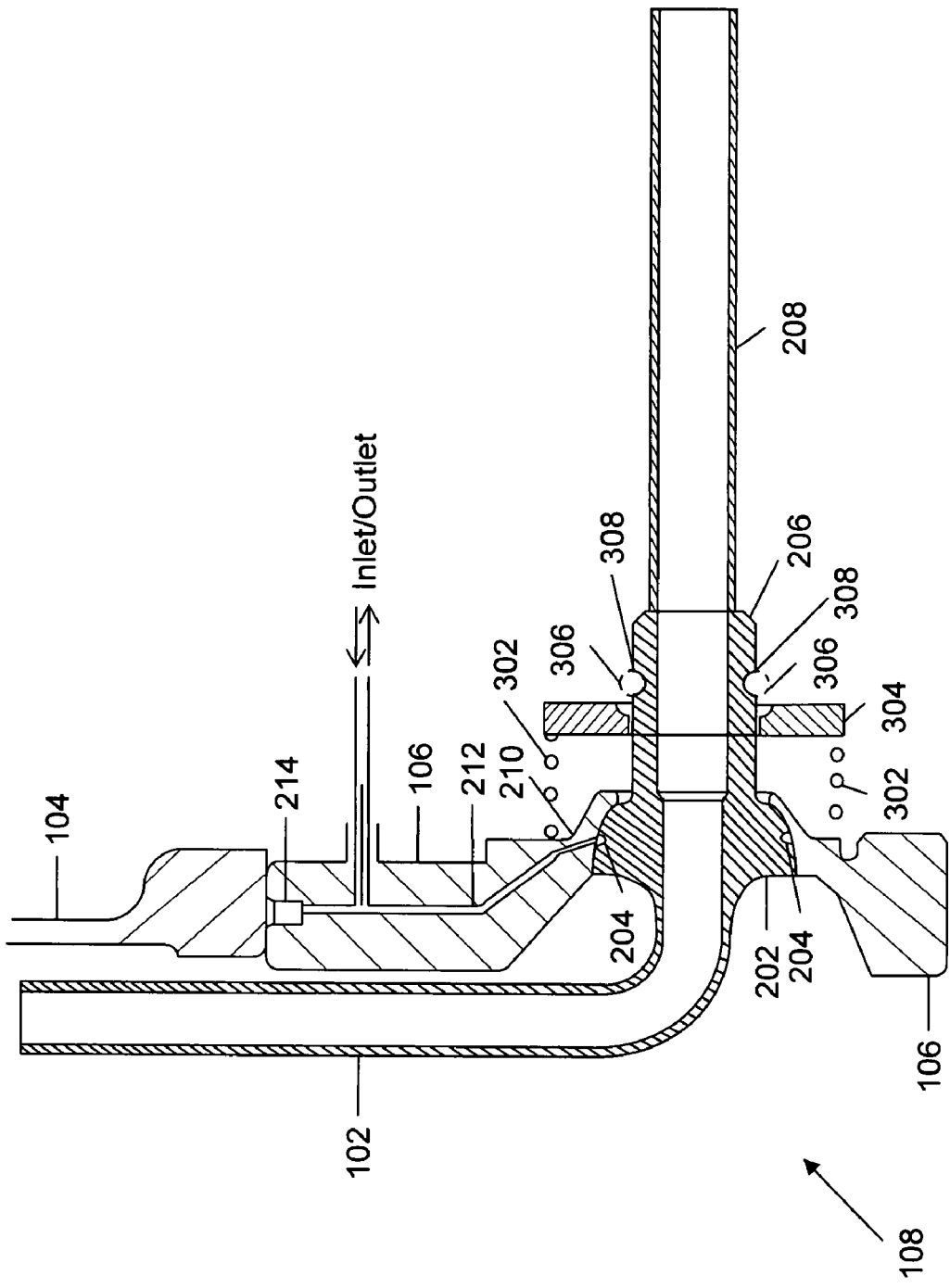
FIG. 3 is a diagram illustrating a clamp mechanism in the ball-cup connection, in accordance with an embodiment of the present invention.

FIG. 3 is a diagram illustrating a clamp mechanism in ball-cup connection 108, in accordance with an embodiment of the present invention. FIG. 3 includes first tube 102, ball interface 202, groove 204 in ball interface 202, outer collar 206, outer part 208 of first tube 102, process tube 104, cup interface 210, support tube 106, gas-feed/discharge channel 212, groove 214 inside the upper surface of support tube 106, a spring 302, a washer 304, a retainer ring 306, and a groove 308 in outer collar 206 of first tube 102.

The cup-ball interface is provided with the clamp to maintain ball interface 202 and cup interface 210, together, in a fixed, contacting position, relative to each other, under all conditions, including high-temperature environments. The clamp applies a variable force on the cup-ball interface, to keep the position of the cup-ball interface intact at high temperatures. The clamp includes spring 302, washer 304 and retainer ring 306.

One end of spring 302 exerts a biasing force on cup interface 210, and the other end of spring 302 exerts the biasing force on washer 304. The biasing force pushes washer 304 against retainer ring 306. Retainer ring 306 is positioned in circumferential groove 308 inside the outer surface of outer collar 206 of first tube 102. As a result, the biasing force exerted by spring 302 pulls ball interface 202 of first tube 102 against and in contact with cup interface 210 in support tube 106, and maintains the position of cup interface 210 and ball interface 202, fixed, relative to each other.

In embodiments of the present invention, shown in the drawings, process tube 104 and first tube 102 are preferably made of silicon carbide. In an embodiment of the present invention, support tube 106 and closure 110 are made of quartz. Depending on the process requirements and processing temperatures, any high-temperature material or combination of high-temperature materials can be selected, including but not limited to, materials comprising quartz, silicon, silicon carbide or aluminum oxide.

The ball-cup connection of the present invention provides many advantages, including a system for connecting two tubes, wherein one tube is inside the other. The ball-cup connection of the present invention prevents the ingress and egress of gases at high temperatures, and also maintains the positions of the cup interface and the ball interface that are fixed, relative to each other, by using a clamp. Further, the ball-cup connection of the present invention prevents the ingress and egress of gases under sub-atmospheric or super-atmospheric pressure conditions.

While various embodiments of the present invention have been illustrated and described, it will be clear that the present invention is not limited to these embodiments only. Numerous modifications, changes, variations, substitutions and equivalents will be apparent to those skilled in the art, without departing from the spirit and scope of the present invention, as described in the claims.

What is claimed is:

1. A joint for connecting a first tube and a second tube, the joint comprising:
   a. the first tube being located within the second tube, the first tube having a ball interface, the ball interface being present at an end of the first tube; and
   b. the second tube having a cup interface, the cup interface being present in a wall of the second tube, the cup interface of the second tube mating with the ball interface of the first tube and forming a cup-ball interface, wherein the cup-ball interface is located in the interior of the second tube; and
   c. a gas seal provided at the cup-ball interface, the gas seal comprising a gas feed/discharge channel, one end of the gas feed/discharge channel configured to be connected to a circumferential groove at the cup-ball interface and the other end configured to be connected to one of an inert gas source and a vacuum source, the inert gas source and the vacuum source configured to maintain respectively super atmospheric and sub atmospheric pressure conditions at the cup-ball interface.

2. The joint of claim 1, wherein the first tube is made of a material selected from the group consisting of quartz, silicon carbide, silicon, and aluminum oxide.

3. The joint of claim 1, wherein the second tube is made of a material selected from the group consisting of quartz, silicon carbide, silicon, and aluminum oxide.

4. The joint of claim 1, wherein the second tube comprises a process tube and a support tube, the support tube supporting the process tube, the support tube providing the cup interface.

5. The joint of claim 4, wherein the support tube is made of a material comprising quartz.

6. The joint of claim 4, wherein the process tube is made of a material comprising silicon carbide.

7. The joint of claim 1 further comprising a clamp, the clamp being provided to maintain the cup interface and the ball interface in a fixed, contacting position relative to each other.

8. The joint of claim 7, wherein the clamp comprises a spring, the spring biasing the cup-ball interface into the contacting position.

9. The joint of claim 1, wherein the first tube is a gas injector tube.

10. The joint of claim 1, wherein the first tube is a thermocouple tube.

11. A joint for connecting a first tube and a second tube, the joint comprising:
    a. the first tube_being located within the second tube, the first tube having a ball interface, the ball interface being present at an end of the first tube;
    b. the second tube comprising a process tube and a support tube, the support tube supporting the process tube, a cup interface being present in a wall of the support tube, the cup interface of the support tube mating with the ball interface of the first tube and forming a cup-ball interface, wherein the cup-ball interface is located in the interior of the support tube; and
    c. a gas seal provided at the cup-ball interface, the gas seal comprising a gas feed/discharge channel, one end of the gas feed/discharge channel configured to be connected to a circumferential groove at the cup-ball interface and the other end configured to be connected to one of an inert gas source and a vacuum source, the inert gas source and the vacuum source configured to maintain respectively super atmospheric and sub atmospheric pressure conditions at the cup-ball interface.

12. The joint of claim 11, wherein the first tube is made of a material selected from the group consisting of quartz, silicon carbide, silicon, and aluminum oxide.

13. The joint of claim 11, wherein the second tube is made of a material selected from the group consisting of quartz, silicon carbide, silicon, and aluminum oxide.

14. The joint of claim 11, wherein the support tube is made of a material comprising quartz.

15. The joint of claim 11 further comprising a clamp, the clamp being provided to maintain the cup interface and the ball interface in a fixed, contacting position relative to each other.

16. The joint of claim 15, wherein the clamp comprises a spring, the spring biasing the cup-ball interface into the contacting position.

* * * * *